United States Patent [19]

Chung et al.

[11] 4,194,969

[45] Mar. 25, 1980

[54] ORE BENEFICIATION PROCESS

[75] Inventors: Harold S. Chung, Lawrenceville; George C. Johnson, Princeton; Tracy J. Huang, Trenton, all of N.J.

[73] Assignee: Mobil Oil Corporation, New York, N.Y.

[21] Appl. No.: 812,972

[22] Filed: Jul. 5, 1977

[51] Int. Cl.² .............................................. B03D 3/06
[52] U.S. Cl. ........................................ 209/5; 209/166
[58] Field of Search ...................... 209/166, 167, 2, 5, 209/3, 12, 458, 500; 423/167

[56] References Cited

U.S. PATENT DOCUMENTS

| | | | |
|---|---|---|---|
| 1,014,254 | 1/1912 | Pratt | 423/167 |
| 1,425,185 | 8/1922 | Ellis | 209/166 |
| 1,547,732 | 7/1925 | Roundbrige | 209/166 |
| 1,900,850 | 3/1933 | Hansen | 209/166 |
| 1,901,221 | 3/1933 | Bullwinkel | 209/2 |
| 1,912,434 | 6/1933 | Crago | 209/166 |
| 1,979,324 | 11/1934 | Gaudin | 209/166 |
| 2,069,182 | 1/1937 | Hagood | 209/166 |
| 2,149,748 | 3/1939 | Samuel | 209/5 |
| 3,302,785 | 2/1967 | Greene | 209/5 |
| 3,314,537 | 4/1967 | Greene | 209/5 |
| 3,359,037 | 12/1967 | Every | 423/167 X |
| 3,736,165 | 5/1973 | Sawyer | 209/5 X |
| 3,879,283 | 4/1975 | Mercade | 209/5 |

*Primary Examiner*—Robert Halper
*Attorney, Agent, or Firm*—Charles A. Huggett; Raymond W. Barclay; Claude E. Setliff

[57] ABSTRACT

A method of modifying the formation of slimes, particularly phosphate slimes, by treating the ore matrix with an electrolyte solution, resulting in their more rapid flocculation.

10 Claims, 3 Drawing Figures

EFFECT of SLIME vs MATRIX TREATMENT

EFFECT of SLIME vs MATRIX TREATMENT

EFFECT OF IONIC SPECIES

ORE BENEFICIATION PROCESS

BACKGROUND OF THE INVENTION

1. Field of the Invention

The invention relates to treatment of ores, particularly phosphate ore. More particularly, it relates to modifying the process of formation of slimes therein. Still more particularly, the invention relates to the modification of slime formation in a phosphate ore matrix by adding thereto an electrolyte solution prior to significant slime generation, e.g., prior to washing or classification.

2. Description of the Prior Art

Phosphate matrix, large deposits of which are found in central Florida, is found largely in deposits averaging about 20 feet in thickness, beginning about 15 feet below the surface. Thus the matrix is mined by open pit methods.

The matrix comprises clay, silica sand and phosphate. The clay is predominantly −5 microns in size. The matrix, after being taken from the ground by draglines, is dropped into an open pit dug out of the surface of the overburden and is transported to the plant by known means.

During hydraulic slurrying, transport, and subsequent washing, screening and classification, extremely finely divided material originally in the matrix remains in suspension in the water, producing the common phosphate slime. There have been many attempts to coagulate slimes and to salvage the phosphate values present therein. Such attempts include mechanical methods (e.g., U.S. Pat. No. 3,008,575) and chemical methods (e.g., U.S. Pat. No. 3,314,537). These methods, though, have operated on the slimes after it is formed. The method of this invention effectively modifies the formation of the slimes, leading to their rapid coagulation.

BRIEF SUMMARY OF THE INVENTION

In accordance with the invention, there is provided a method for modifying the formation of slimes during beneficiation of an ore matrix, the method comprising adding to the matrix an electrolyte solution, the electrolyte being a salt containing a metal cation. Preferably, the metal of the water soluble salt will be multivalent, i.e., it will have a valence greater than 1.

DESCRIPTION OF SPECIFIC EMBODIMENTS

Figure 1:
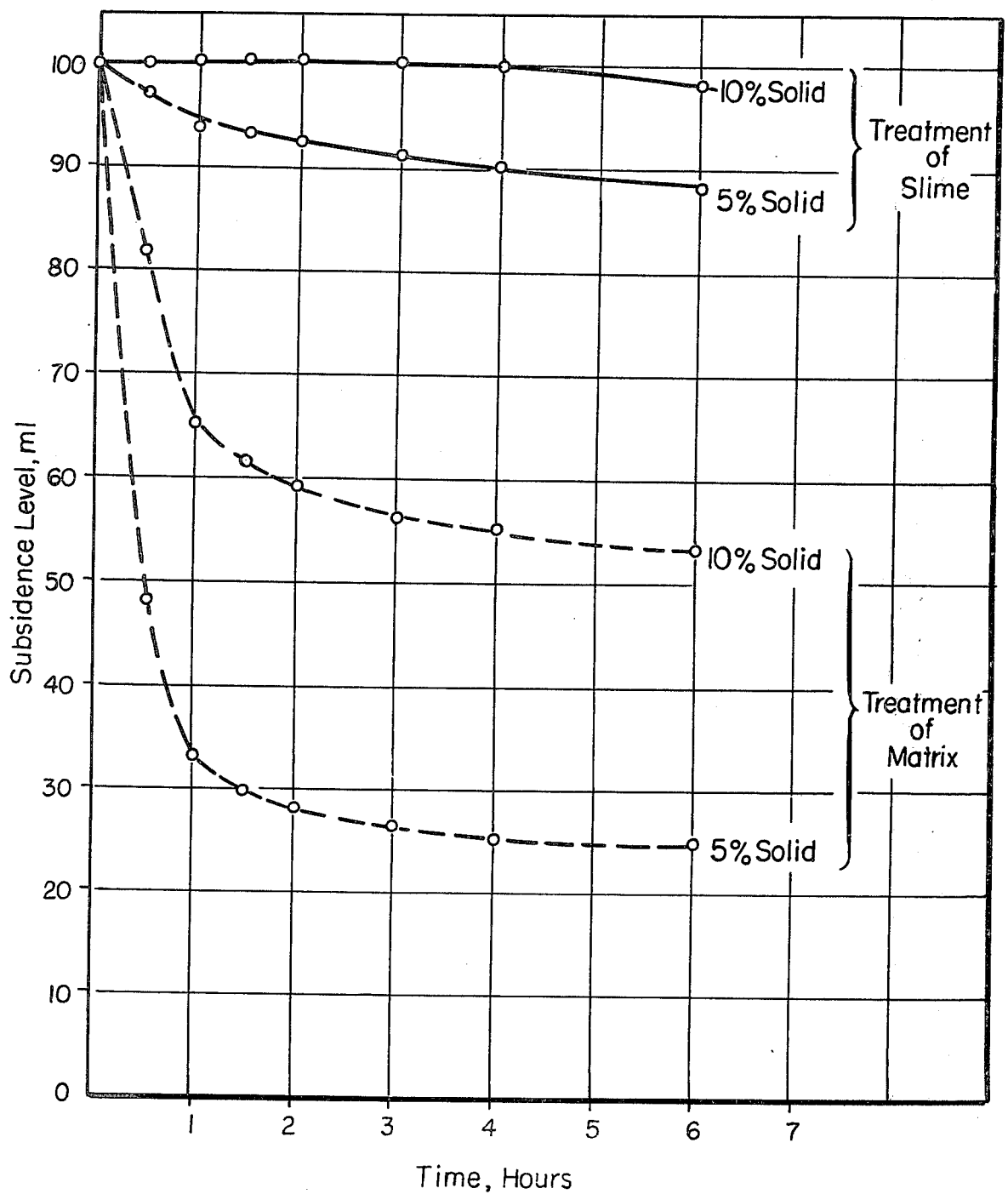
FIGS. 1 through 3 are graphs summarizing experimental work involving $Na^+$, $Ca^{+2}$, zirconium ionic species and $Al^{+3}$.

As has already been mentioned, generally the problem of slimes is attacked after they have been formed. The body of available art is so large that only two references were mentioned in the prior art discussion. Without naming more of them here, suffice it to say that applicants know of no references which relate to the chemical treatment of the slimes problem that do not relate to treatment of the slimes per se.

It is an object of this invention to employ a method which substantially modifies slimes formation such that the resulting slimes settle rapidly. The object is accomplished by adding an electrolyte to the ore matrix prior to the rigorous hydrotreatment that occurs prior to and during screening, sizing and the like.

The metal ions that may be used to yield the advantages of the invention include $Al^{+3}$, $Ca^{+2}$, $Cd^{+2}$, $Ti^{+4}$, $Ga^{+3}$, $Ce^{+4}$, $Co^{+2}$, $Cu^{+2}$, $Fe^{+3}$, $Pb^{+2}$, $Mg^{+2}$, $Hg^{+2}$, $Ni^{+2}$, $Sr^{+2}$, and $Zn^{+2}$ and mixtures thereof. Metal ions that may be used, but that are less preferred are Na, Ag and K. The most preferred ions are $Al^{+3}$, $Mg^{+2}$ and $Ca^{+2}$. In addition to those already named, the metal ions will also include others from the rare earths and Group IA and B, II A and B, III A, IV A, IV B, V B, VI B and VIII of the Periodic Table.

The anion of the salt can be any convenient simple anion such as the nitrate, chloride, sulfate, acetate hydroxide and the like.

The salt may contain one kind of metal ion and one kind of anion, or it may contain more than one kind of ion (as found in alum) and more than one kind of anion (as found in chlorinated aluminum hydroxide).

We have found that the effective concentration of metal ion in solution will vary depending upon the metal cation. However, in general, we prefer to use from about 5 to about 40,000 ppm, preferably from about 20 to about 500 ppm when the solids content is from 1 to about 50% by weight.

In the conventional phosphate beneficiation process, tremendous quantities of slimes are formed, amounting to about 20–40% of the phosphate ore mined. When it is considered that these slimes are formed as aqueous suspensions containing about 1–5% solids, one can readily appreciate the enormous quantities of water used. It is the disposal of the vast amounts of slimes generated and secondarily the recovery of phosphate values from slimes that present perhaps the most pressing problems that face the phosphate industry, and that have faced it for a long time.

Slimes present a problem because they retain substantial amounts of their original water, even after years of settling. Not only does this result in an area having no bearing strength, but it also results in the waste of increasingly rare natural resources, water and land. In this regard, even after settling for many years, the slimes settle to only about 25–30% by weight of solids and still are jelly-like in consistency. So, considering this, it is no wonder that there are such large areas near the phosphate producing areas of Florida that are virtually useless for any purpose.

Because of this, dammed ponds are necessary to retain the slimes, and they must be continuously inspected and repaired. Such dams have been known to fail, and when they do, the land, rivers and lakes may be polluted. This is especially severe in the case of polluted waters because of the potentially lethal effects on fish and other life.

The industry has attempted over the years to eliminate the wasteful loss of phosphate values, water and land. The efforts have been briefly referred to hereinabove. Such efforts are so numerous that no purpose would be served by enumerating them. Suffice it to say that none of the previous methods have met with the success required in commercial operations and that none disclose or suggest the present method. It is believed that the present method is a significant contribution to the ore beneficiation art, and would certainly already be in use if the published art had any suggestion of it. It is, however, still the practice to dispose of slimes in ponds created in mined-out areas, principally because no one has discovered heretofore a truly effective means of handling slimes.

The following will generally illustrate the plant-scale operation of the invention.

After the overburden is removed, the ore matrix is mined by the dragline and slurried with an electrolyte-containing solution (particularly an aluminum-containing solution) using a high-speed jet. The matrix slurry is moved to the beneficiation plant through a pipeline. In the plant, the slurry first goes through the screening, washing, sizing and clarification steps in which water containing the same or different electrolytes at the same or different concentration level is used. The slime solutions obtained from these steps are sent to a slime pond for settling and may be recycled. After the clarification, the phosphate-containing solid is fed to the rougher and amine flotation units from which concentrated phosphate rock is produced.

Optionally, the ore matrix can be moved to the plant by a conveyor and the slurry is made with an electrolyte-containing solution in the plant prior to the screening step.

Having described the invention in general terms, the following will serve to specifically illustrate it, with the understanding that they are illustrations only.

The Examples which follow are taken from work performed on samples obtained from the Florida phosphate fields. They illustrate the effectiveness of the various electrolytes of the invention in modifying slime formation.

EXAMPLE 1

Two ore matrices were investigated in this example. Ores A and B (both from Fort Meade, Florida), respectively have 62.3% and 76% solids.

For each matrix, approximately 300 grams of material were thoroughly mixed. Ten grams of the mixture were weighed into 100 ml stoppered graduates. Calcium chloride solutions of varying concentrations were added to bring the levels up to the 100 ml mark. A glass rod was used to thin this mixture and to help in breaking up the matrix. The graduates were then shaken vigorously until all ore particles appeared to have been completely disaggregated, after which they were placed in a vertical position for sedimentation. In this study, measurements were made of the rate of subsidence, defined as the rate of downward movement of the boundary between the clear liquid and the turbid solid suspension. The subsidence level is the actual position of the interface (graduate reading in millileters).

It was found that the greatest rate of subsidence was during the first hour. The level in graduates, containing ore A containing 1 or 2% $CaCl_2$ was at 67 ml at the end of the first hour, while those with 3 and 5% were respectively at 63 and 60. At the end of the third hour, the subsidence at concentration of 1, 2, 3 and 5% were, respectively, 57, 56, 50 and 46. At 90 hours they were 46, 41, 34, and 35. Comparable results were obtained on ore B.

In contrast, one graduate had only distilled water added to it. After 3 weeks, there was zero subsidence, i.e. the level was at the 100 mark. Generally, higher concentrations of electrolytes led to more rapid settling, with a slight reversal of this trend between 1 and 2% $CaCl_2$, probably attributable to minor inhomogeneities in the samples.

For $CaCl_2$ concentrations between 1–5% (3,600–18,000 ppm Ca++), sedimentation was initially fast, but slowed as time proceeded, reaching, as has already been indicated, a subsidence level between 34–46 ml after 90 hours. This corresponded to a solid content between 22–29% on as is basis.

EXAMPLE 2

In this example, the same phosphate ores and substantially the same procedure as set forth in Example 1 were used. The electrolyte ions used were derived from NaCl, $CaCl_2$, $Al_2(SO_4)_3$ and $ZrCl_4$.

(a) The effect of the $Al^{+3}$ ion against slime already formed and in the treatment of the matrix of ore A per se was measured. All tests were with 100 ppm $Al^{+3}$ (as the sulfate). Results are shown in FIG. 1.

Figure 2:
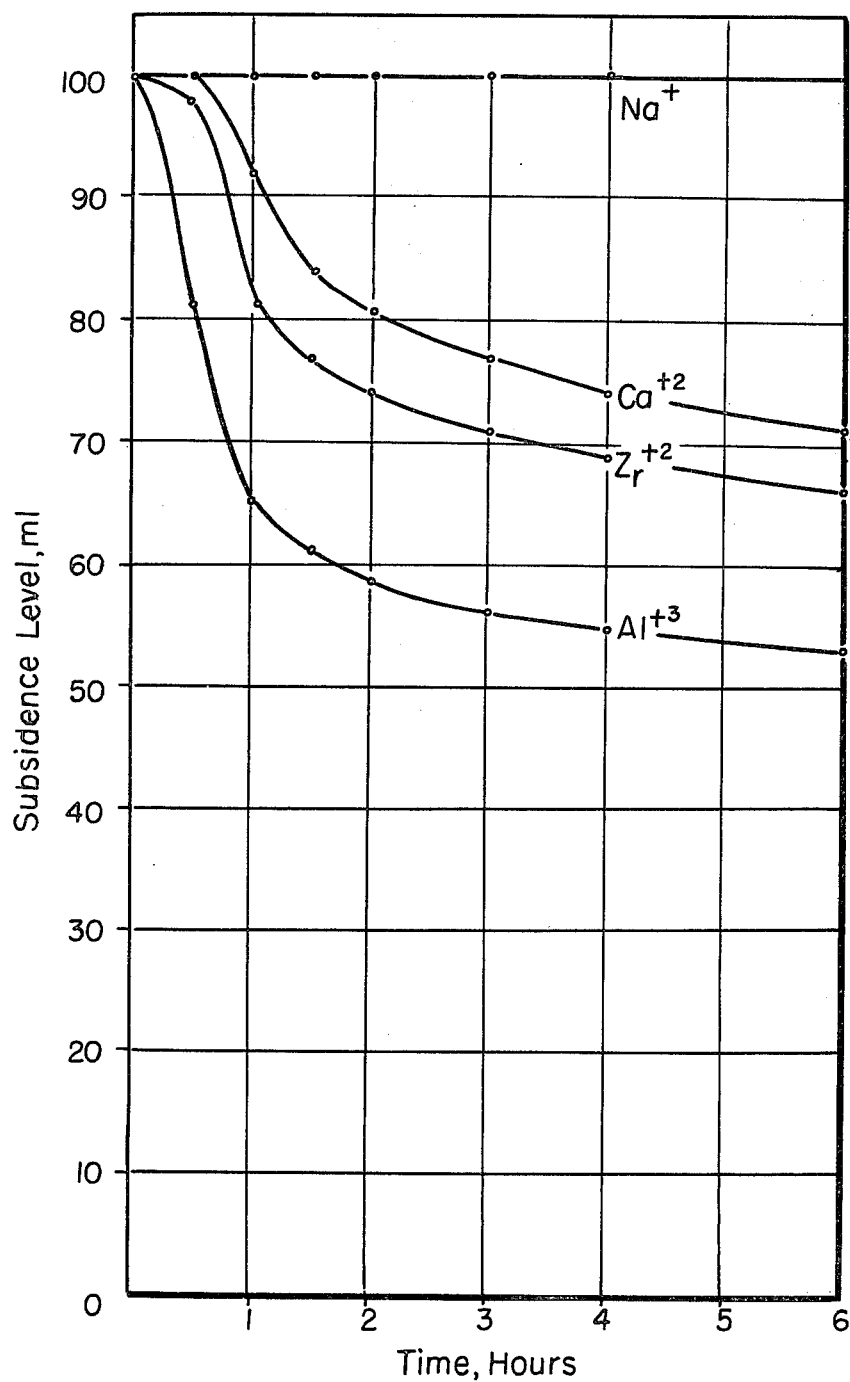

(b) A comparison of various ions, including $Na^+$, was made on a phosphate matrix (ore A) containing 10% matrix solids. The respective samples of ores were treated with 100 ppm of each of $Na^+$ (as the chloride), $Ca^{+2}$ (as the chloride), $ZrO^{+2}$ and other zirconium species (as the tetrachloride) and $Al^{+3}$ (as the sulfate). The results are as shown in FIG. 2.

Figure 3:
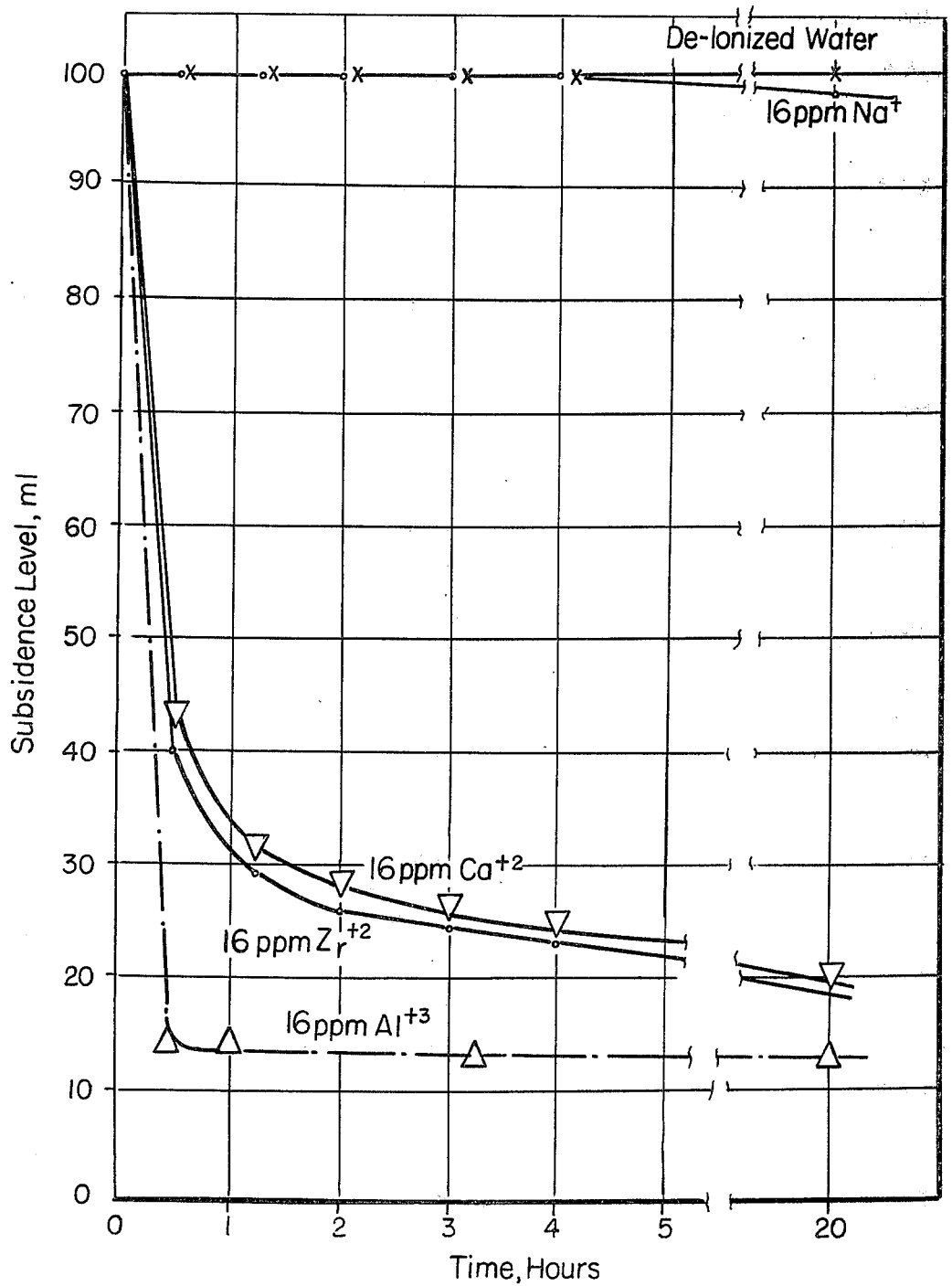

(c) A third test was run using ore B to further check the effect of ionic species. All were made at the 10% solids level. The results are found in FIG. 3.

From the three figures, one can draw the following conclusions:

Matrix treatment is much superior to slime treatment by multivalent cations (see FIG. 1).

The presence of an electrolyte in matrix treatment does greatly improve the sedimentation as compared to the de-ionized water (see FIG. 2).

The valence of the cations is important. Generally, the higher the valence, the more effective is the treatment (see FIGS. 2 and 3). The reversal in the case of zirconium ions is attributable to the fact that zirconium tetrachloride hydrolyzes principally to $ZrO^{+2}$ and probably to higher charged species.

The $Na^+$ treatment gave a moderate sedimentation of the larger particles, leaving the fine particle suspended in the top solution. Although the $Na^+$ treatment is less effective than the multi-valent cation treatments, it is better than the plain water treatment.

We claim:

1. A method of substantially modifying the formation of slimes during beneficiation of a Florida phosphate ore matrix, the method comprising adding to a matrix slurry, prior to washing or classification, an electrolyte solution comprising a water soluble metal salt, the metal cation of said salt being Al, Ca, Mg or Zr.

2. The method of claim 1 wherein said metal cation is Al.

3. The method of claim 1 wherein said metal cation is Mg.

4. The method of claim 1 wherein said metal cation is Ca.

5. The method of claim 1 wherein said metal cation is Zr.

6. The method of claim 1 wherein the salt is aluminum sulfate.

7. The method of claim 1 wherein the salt is alum.

8. The method of claim 1 wherein the salt is chlorinated aluminum hydroxide.

9. The method of claim 1 wherein the concentration of said water soluble salt is from about 5 ppm to about 40,000 ppm.

10. The method of claim 9 wherein the concentration is from about 20 ppm to about 500 ppm.

* * * * *